(12) United States Patent
Fredskild et al.

(10) Patent No.: US 9,050,786 B2
(45) Date of Patent: Jun. 9, 2015

(54) METHOD OF MANUFACTURING AN ELONGATED COMPOSITE STRUCTURE

(75) Inventors: Martin Fredskild, Odense C (DK);
Bjarne Krab Mortensen, Billund (DK);
Martin Dahl, Egtved (DK)

(73) Assignee: LM GLASFIBER A/S, Kolding (DK)

( * ) Notice: Subject to any disclaimer, the term of this patent is extended or adjusted under 35 U.S.C. 154(b) by 74 days.

(21) Appl. No.: 13/813,581

(22) PCT Filed: Jul. 20, 2011

(86) PCT No.: PCT/EP2011/062474
§ 371 (c)(1),
(2), (4) Date: Jan. 31, 2013

(87) PCT Pub. No.: WO2012/019888
PCT Pub. Date: Feb. 16, 2012

(65) Prior Publication Data
US 2013/0126089 A1    May 23, 2013

(30) Foreign Application Priority Data
Aug. 13, 2010 (EP) .................................... 10172792

(51) Int. Cl.
*B29C 70/36* (2006.01)
*B32B 37/14* (2006.01)
*B29C 70/48* (2006.01)
*B29D 99/00* (2010.01)
*B29L 31/08* (2006.01)

(52) U.S. Cl.
CPC ................. *B32B 37/14* (2013.01); *B29C 70/48* (2013.01); *B29D 99/0028* (2013.01); *B29L 2031/085* (2013.01)

(58) Field of Classification Search
CPC ...... B29C 43/12; B29C 70/443; B29C 70/48; B29D 99/0025; B29D 99/0028; B29L 2031/08; B29L 2031/085
USPC .............. 264/297.8, 299, 308, 313, 319, 320, 264/553, 571, 258; 156/288, 289, 304.1, 156/304.5, 152; 428/60
See application file for complete search history.

(56) References Cited

U.S. PATENT DOCUMENTS 2,276,035 A * 3/1942 Guhl .............................. 156/224
3,967,996 A    7/1976 Kamov et al.
(Continued)

FOREIGN PATENT DOCUMENTS

EP    1 310 351 A1    5/2003
EP    1 584 817 A1    10/2005
(Continued)

*Primary Examiner* — Scott W Dodds
(74) *Attorney, Agent, or Firm* — Nath, Goldberg & Meyer; Jerald L. Meyer; Sanjana Mangalagiri

(57) ABSTRACT

A method of manufacturing an elongated composite structure having two separate longitudinal composite structure sections, where said method comprises the following steps: providing a rigid mold part 13 having a first forming surface 14 with a contour defining an outer surface of the elongated composite structure, arranging a first fiber lay-up 15 in a first longitudinal section 16 of the first mold part 13, arranging a first flexible foil 18 over a first crosswise edge area 17 of the first fiber lay-up 15, arranging a second fiber lay-up 20 in a second longitudinal section 21 of the mold part 13 so as to overlap the crosswise edge area 17 of the first lay-up 15 and thereby the first flexible foil 18 in an overlap area 22 forming an interface between the fiber lay-ups 15,20, providing polymer to the fiber lay-ups 15,20 and allowing the polymer to cure.

15 Claims, 9 Drawing Sheets

(56) References Cited

U.S. PATENT DOCUMENTS

2008/0115887 A1     5/2008   Kaye et al.
2009/0250847 A1*   10/2009   Burchardt et al. ............ 264/511
2011/0254189 A1*   10/2011   Doyle et al. .................. 264/101

FOREIGN PATENT DOCUMENTS

WO           2006/002621 A1     1/2006
WO       WO 2010040576 A1 *   4/2010   .............. C04B 28/00

* cited by examiner ns, which make it possible to obtain a good fit between the sections, when they are assembled into the composite structure.

METHOD OF MANUFACTURING AN ELONGATED COMPOSITE STRUCTURE

This is a National Phase Application filed under 35 U.S.C. 371 as a national stage of PCT/EP2011/062474, filed Jul. 20, 2011, and claims priority benefit from European Application No. 10172792.3, filed Aug. 13, 2010, the content of each of which is hereby incorporated by reference in its entirety.

TECHNICAL FIELD

The present invention relates to a method of manufacturing an elongated composite structure such as a shell half of a wind turbine blade or a wind turbine blade, said composite having a longitudinal axis and comprising separate longitudinal composite structure sections and being formed of reinforced polymer material including a polymer matrix and fibre material embedded in the polymer matrix.

BACKGROUND

Frequently, large elongated composite structures of fibre-reinforced polymer are manufactured as shell parts in moulds where a first side and a second side of the structure are manufactured separately and assembled afterwards. Thus, wind turbine blades are usually manufactured as shell parts in moulds, where the pressure side and the suction side, respectively, are manufactured separately. Afterwards, the two blade halves are glued together, often by means of internal flange parts.

Large composite structures may be manufactured in various ways. Vacuum infusion or VARTM (Vacuum Assisted Resin Transfer Moulding) is one method, which is typically employed for manufacturing composite structures such as wind turbine blades comprising fibre-reinforced matrix material. During the manufacturing process, liquid polymer, also called resin, is filled into a mould cavity, in which fibre material, also called fibre lay-up, has been previously inserted and where vacuum is generated in the mould cavity hereby drawing in the polymer. The polymer can be thermoset plastic or thermoplastic. Typically, uniformly distributed fibres are layered in a first rigid mould part, the fibres being rovings, i.e. bundles of fibre bands, bands of rovings or mats, which are either felt mats made of individual fibres or woven mats made of fibre rovings. Subsequently, a second mould part, which is often made of a resilient and flexible polymer foil, also called a vacuum bag, is placed on top of the fibre material and sealed against the first mould part in order to generate a mould cavity. By generating a vacuum, typically 80-95% of the total vacuum in the mould cavity between the first mould part and the vacuum bag, the liquid polymer can be drawn in and fill the mould cavity with the fibre material contained therein. So-called distribution layers or distribution tubes, also called inlet channels, are used between the vacuum bag and the fibre material in order to obtain as sound and efficient a distribution of polymer as possible. In most cases, the polymer applied is polyester or epoxy, and the fibre reinforcement is often based on glass fibres or carbon fibres. However, other types of fibres, such as natural fibres and steel fibres, may also be used.

During the process of filling the mould, a vacuum is generated via vacuum outlets in the mould cavity, said vacuum in this connection being understood as an underpressure or negative pressure, whereby liquid polymer is drawn into the mould cavity via the inlet channels in order to fill said mould cavity. From the inlet channels, the polymer disperses in all directions in the mould cavity due to the negative pressure as the flow front moves towards the vacuum channels.

Often, the composite structures comprise a core material covered with a fibre-reinforced material such as one or more fibre-reinforced polymer layers. The core material can be used as a spacer between such layers to form a sandwich structure and is typically made of a rigid light-weight material in order to reduce the weight of the composite structure. In order to ensure an efficient distribution of the liquid resin during the impregnation process, the core material may be provided with a resin distribution network, e.g. by providing channels or grooves in the surface of the core material.

Another method for manufacturing composite structures is resin transfer moulding (RTM) which is similar to VARTM. In RTM, the liquid polymer is not drawn into the mould cavity due to a vacuum generated in the mould cavity. Instead the liquid resin is forced into the mould cavity via an overpressure at the inlet side.

A third method for manufacturing composite structures is pre-preg moulding. Pre-preg moulding is a method in which reinforcement fibres are pre-impregnated with a precatalysed resin. Typically, the resin is solid or nearly solid at room temperature. The pre-pregs are arranged by hand or machine onto a mould surface, a vacuum bag, and heated to a temperature where the resin is allowed to reflow and eventually cured. This method has the main advantage that the resin content in the fibre material is accurately set beforehand. The pre-pregs are easy and clean to work with and make automation and labour saving visible. The disadvantage with pre-pregs is that the material costs are higher than for non-impregnated fibres. Further, the core material needs to be made of a material which is able to withstand the process temperatures needed for bringing the resin to reflow. Pre-preg moulding may be used both in connection with an RTM and a VARTM process.

Further, it is possible to manufacture hollow composite structures in one piece by use of outer mould parts and a mould core. Such a method is e.g. described in EP 1 310 351 and may readily be combined with RTM, VARTM and pre-preg moulding.

Certain composite structures, such as wind turbine blades, have become increasingly longer over the years, and today blades of more than 60 m are manufactured. As the production facilities for large composite structures, such as wind turbine blades, are usually not located next to the site of use of the structures, the structures need to be transported from the production site to the site of use. Transportation of such large structures is often problematic as they are usually transported by road at least part of their way from the production facility to the site of use. Therefore, there is a need for blades that may be transported more easily.

Therefore, it has been proposed to separate wind turbine blades into two or more separate blade sections and then assemble the blades at the site of the wind turbine plant. Thereby, it is possible to manufacture the separate blade sections in smaller moulds and it is less problematic to transport the blade sections than a blade. An example of such blade is described in EP 1 584 817 A1. However, producing the separate blade sections in separate moulds may create problems in obtaining a perfect fit between the blade sections and thereby in assembling the blade sections into a wind turbine blade.

DISCLOSURE OF THE INVENTION

It is an object of the invention to provide a new method of manufacturing assembled composite structures as well as to provide composite structures and composite structure sections obtained by the method and which overcome or ameliorate some of the disadvantages of the prior art or which provide a useful alternative.

According to a first aspect of the invention, this is obtained by a method comprising the following steps:

a) providing a first rigid mould part having a first forming surface with a contour defining an outer surface of the elongated composite structure, b) arranging a first fibre lay-up in a first longitudinal section of the first mould part, the first fibre lay-up defining a first crosswise edge area, c) arranging at least one first flexible and preferably resilient foil, preferably a polymer foil, over at least the first crosswise edge area of the first fibre lay-up, d) arranging a second fibre lay-up in a second longitudinal section of the first mould part so that the second fibre lay-up overlaps the first crosswise edge area of the first lay-up and thereby the first flexible foil in an overlap area forming an interface between the first fibre lay-up and the second fibre lay-up, e) providing polymer to the first and second longitudinal sections simultaneously with steps b) and d), respectively, and/or after step d), and f) curing or allowing the polymer to cure.

Thereby a first longitudinal composite structure section and a second longitudinal composite structure are formed. The first longitudinal composite structure and second longitudinal composite structure are advantageously separated from each other at the overlap area or interface after step f). By manufacturing the longitudinal composite structure sections in one and the same mould part and by separating the first and the second fibre lay-ups in the overlap area by means of the relatively thin first flexible foil, a perfect fit between the composite structure sections is obtained, as in the overlap area or interface, the two composite structure sections will be formed completely complementary to each other. After having been removed from the mould part and separated from each other, the formed composite structure sections can as a result be transported separately to the site of use and assembled there. The perfect fit between the two composite structure sections allow for providing a perfect glue joint between the two sections when they are to be interconnected to form the elongated composite structure.

Advantageously, a first mould cavity comprising the first fibre lay-up and a second mould cavity comprising the second fibre lay-up are formed during the manufacturing method. The two mould cavities are advantageously separated by the first flexible foil. Since the first flexible foil separates the first mould cavity and the second cavity, it is ensured that two separate longitudinal composite structure sections are formed, which subsequently can be separated from each other at the overlap area or interface.

Advantageously, the first flexible foil does not melt or in any other way become part of the composite structure sections. The flexible foil may advantageously be a so-called vacuum foil or vacuum bag. The vacuum foil may be provided with a release agent so that the composite structure sections easily may be separated.

It should be noted that only the first flexible foil is needed and that the first foil only needs to cover the first crosswise edge area of the first fibre lay-up, if the composite structure formed by the at least two separate composite structure sections is manufactured by using a pre-impregnated fibre material, i.e. pre-preg., or by hand lay-up. The reason why is that it is not necessary to evacuate the mould cavities when using hand lay-up or pre-pregs., whereby the first foil may be a foil strip essentially only covering the first crosswise edge area of the first fibre lay-up, the rest of the first fibre lay-up and the second fibre lay-up not being covered at all.

According to an embodiment of the invention, in step c) the at least one flexible foil is arranged so as to cover the entire first fibre lay-up and sealed to the first mould part to form a first mould cavity and wherein subsequent to step d) and prior to step f) a second flexible and preferably resilient foil, preferably a polymer foil, is arranged over the second fibre lay-up and sealed to the first mould part so as to form a second mould cavity.

A further embodiment comprises the step of arranging at least one second flexible and preferably resilient foil, preferably a polymer foil, over the first and the second lay-up and sealing the at least one second flexible foil to the first mould part to form a first mould cavity and a second mould cavity, the first and the second mould cavity being separated by the first flexible foil. Accordingly a first mould cavity may be formed between the first mould part and the first flexible foil, and a second mould cavity may be formed between the first mould part, the first flexible foil, and the second flexible foil. One end of the second flexible foil may be sealed to the first flexible foil.

In principle it is also possible to form the two mould cavities by a single flexible foil, for instance by providing the flexible foil with a flap which is arranged between at the overlap area or by folding the flexible foil onto itself at the overlap area.

According to a further embodiment, the composite structure is a hollow structure formed in a closed mould, the closed mould comprising a flexible, preferably resilient, and collapsible mould core, the first rigid mould part and a second rigid mould part having a second forming surface with a contour defining an outer surface of the composite structure, the first and second mould part being arranged to close around the mould core, and wherein subsequent to step d):

the mould core is arranged on the first and second fibre lay-up and the first flexible foil, a third fibre lay-up is arranged on a first longitudinal section of the core and/or the second mould part, the third fibre lay-up defining a second crosswise edge area, a third flexible foil, preferably a polymer foil, is arranged over at least the second crosswise edge area, a fourth fibre lay-up is arranged on a second longitudinal section of the core and/or the second mould part so that the fourth fibre lay-up overlaps the second crosswise edge area of the third fibre lay-up and thereby the third flexible foil in a second overlap area forming a second interface between the third and the fourth lay-up, and the mould is closed by arranging the second mould part over the first mould part and the mould core to form a first circumferential mould cavity and a second circumferential mould cavity, the first and the second circumferential mould cavities being separated by means of the first and third flexible foil.

As seen circumferentially, the second overlap area, i.e. the second interface, may advantageously merge into the first overlap area, i.e. the first interface, to form a circumferential continuous overlap area between the lay-ups.

When manufacturing the composite structure by VARTM, the mould cavity is, as previously explained, evacuated prior to supplying liquid polymer to the cavity.

According to an embodiment, the first and the second mould cavities are therefore evacuated prior to step e), when the composite structure is manufactured by VARTM.

According to a further embodiment of the invention, the fluid polymer is supplied to the first and the second mould cavity during step e) to fill the mould cavities with polymer.

The first mould cavity may be evacuated prior to step d), whereby the first fibre lay-up is compacted before the second fibre lay-up is arranged in the second longitudinal section of the first mould part. It should, however, be noted that such procedure is not readily possible when the composite structure is a hollow structure formed in a closed mould by the method described above for manufacturing a hollow structure.

According to a further embodiment, pre-impregnated fibre material is arranged in the first and/or the second longitudinal section of the first mould part during step b) and/or step d).

When manufacturing the composite structure by using only pre-impregnated fibre material, the polymer is, as explained above, arranged in the first longitudinal section and in the second longitudinal section of the first mould part together with the fibre material, i.e. the polymer is incorporated in the fibre lay-up. When using pre-pregs, it is also advantageously to evacuate the first and second mould cavity in order to remove air and thereby avoid inclusion of air in the composite structure.

Further, it should be noted that the overlap area, i.e. the interface between the first and second fibre lay-ups and/or the third and fourth lay-ups, respectively, may extend essentially perpendicular to the longitudinal axis of the composite structure.

Alternatively, the overlap area, i.e. the interface, between the first and the second fibre lay-ups and/or the third and fourth lay-ups, respectively, may extend obliquely to the longitudinal axis of the composite structure, preferably forming an angle of between 30-80°, alternatively of between 45-80°, and alternatively of between 45-70°, with the longitudinal axis of the composite structure.

By providing an obliquely extending overlap area, the joint area between the composite structure sections of the manufactured composite structure also extends obliquely to the longitudinal axis. This is advantageously when during use, the assembled composite structure is subjected to a bending moment, as the bending moment is absorbed partially by the composite structure and partially by the joint area.

The elongated composite structure may have a length of at least 30 m, or at least 40 m, or at least 50 m or at least 60 m.

Each of the sections of the composite structure may have a length of at least 10 m, or at least 20 m, or at least 25 m or at least 30 m.

According to a further embodiment, the interface between the first and the second fibre lay-ups and/or the third and fourth lay-ups, respectively, is substantially parallel to the longitudinal axis of the composite structure to be manufactured.

According to a further embodiment, the interface between the first and the second fibre lay-ups is tapering from an upper surface of the first fibre lay-up towards the first forming surface of the first mould part. If the composite structure is a wind turbine shell part, this means that the finished composite sections are tapering from an inner surface of an assembled blade shell to an outer surface of the assembled blade shell. Correspondingly, the interface between the third and the fourth fibre lay-ups may taper from the forming surface of the second mould part towards an outer surface of the core when the composite structure is a hollow structure.

According to a further embodiment, the interface tapers gradually or smoothly.

The tapering interface between the first and the second fibre lay-ups and/or the third and fourth fibre lay-ups, respectively, may also taper stepwise.

According to a further embodiment of the invention, the interface between the first and the second fibre lay-ups and/or the third and fourth lay-ups, respectively, is formed as a tongue and a groove in the respective lay-ups.

The composite structure may also comprise a local thickening at the overlap area so as to improve the mechanical strength when the two longitudinal sections are subsequently assembled. This means that additional fibre material may be provided at the first fibre lay-up and/or the second fibre lay-up at the overlap region.

A tongue and groove joint is believed to be well-suited for absorbing bending moments in a composite structure comprising two assembled composite structure sections manufactured by means of the method according to the invention.

According to an embodiment, the composite structure is at least a part of a shell half of a wind turbine blade, the first and the second composite structure sections forming respective longitudinal sections of the shell half of the wind turbine blade.

The first and the second composite structure sections may jointly form the entire shell half of the blade when being interconnected. However, it should be noted that the shell half of the wind turbine blade may comprise more than two composite structure sections.

According to an additional embodiment, the hollow composite structure is at least a part of a wind turbine blade, the first and the second hollow composite structure sections forming respective longitudinal sections of the wind turbine blade.

The longitudinal sections may jointly form the entire blade when being interconnected. It should, however, be noticed that the hollow composite structure may comprise more than two, such as three, hollow composite structure sections.

In order to further improve the fit between the manufactured composite structure sections when these are assemble to form the composite structures, longitudinal extending guide means may be arranged in and/or on the first and second lay-ups and/or the third and fourth lay-ups, respectively, so as to extend between the respective lay-ups and crossing the overlap area therebetween.

The longitudinally extending guide means may comprise at least one guide rod arranged in the first and the second lay-ups to longitudinally and sealingly extend through the first flexible foil and so that a first portion of the guide rod extends into the first lay-up and a second portion of the guide rod extends into the second lay-up.

Correspondingly, at least one guide rod may be arranged in the first and in the second lay-ups to longitudinally and sealingly extend to the third flexible foil and so that a first portion of the guide rod extends into the third lay-up and the second portion of the guide rod extends into the fourth lay-up.

The first and/or the second portion of the guide rod are provided with a release agent allowing the guide rod to be removed from the respective lay-up after curing of the polymer.

Thereby, it is possible to use the guide rod as a connection means between the two manufactured composite structure sections in addition to using the guide rod as a guide means.

Further, after curing of the polymer, guide means may be attached to the first and second longitudinal sections of the composite structure, said guide means crossing the overlap area therebetween.

Advantageously, the guide means are attached to inner surfaces of the composite structure sections.

According to a further embodiment, after curing of the polymer the formed composite structure is removed from the mould and the first composite structure section is separated from the second composite structure section.

An embodiment of the invention further comprises transportation of the first and second composite structure sections to the site of use and interconnection of the first and second composite structure sections at the site.

The interconnection may comprise a glue joint in the interface between the first and the second composite structure sections.

Connection means usable for interconnecting the first and the second composite structure sections may be arranged in and/or on the first and second lay-ups and/or the third and fourth lay-ups.

After curing of the polymer, connection means usable for interconnecting the first and the second composite structure sections may be attached to said sections. The connection means may comprise metal members extending across the joint area between the two sections and being connected thereto by means of fastening means such as bolts and/or screws and nuts.

According to a further aspect, the present invention relates to a wind turbine blade comprising a shell half formed by interconnecting longitudinal shell sections manufactured by means of the method according to the invention.

According to an additional aspect, the present invention relates to a wind turbine blade formed by interconnecting two hollow shell sections manufactured by means of the method according to the invention.

According to yet another aspect, the invention provides intermediate products formed by use of the method according to the invention. The intermediate products may accordingly comprise at least a first longitudinal composite section and a second longitudinal composite section. According to a preferred embodiment, the first longitudinal composite section is a first wind turbine blade shell part, and the second longitudinal composite section is a second wind turbine blade shell part. Thus, it is seen that the invention also provides a kit of parts comprising a first wind turbine blade shell part and a second wind turbine blade shell part. These parts may be transported to and assembled at a wind turbine erection site.

BRIEF DESCRIPTION OF THE DRAWING(S)

The invention is explained in detail below with reference to the drawing(s), in which FIG. 1 shows a schematic view of a wind turbine blade comprising two shell halves forming the pressure side and the suction side of the blade, respectively, and being glued together along the chordal plane of the blade, FIG. 2 shows a schematic plane view of a first rigid mould part to be used for forming the pressure side shell half of the blade by means of the method according to the invention, FIG. 3 is an enlarged sectional view along the lines III-III in FIG. 2 and shows a first embodiment of an overlapping area between fibre lay-ups, FIG. 4 is an enlarged sectional view corresponding to FIG. 3 of a second embodiment of an overlapping area between two lay-ups, FIG. 5 is an enlarged sectional view corresponding to FIG. 3 and shows a third embodiment of an overlap area between two lay-ups, FIG. 6 is an enlarged sectional view corresponding to FIG. 2 and shows a fourth embodiment of an overlap area between two lay-ups, FIG. 7 is an enlarged sectional view corresponding to FIG. 4 and shows in addition thereto a guide rod arranged in the overlap area between the two lay-ups, FIG. 8 shows schematically a transverse sectional view through mould parts to be used for manufacturing a wind turbine blade by hollow moulding and by means of the method according to the invention, FIG. 9 shows schematically a sectional view along the lines IX-IX in FIG. 8, FIG. 10 is a schematic, longitudinal, sectional view through a joint area between shell sections being manufactured by means of the method according to the invention and shows a first example of a guide means assisting in guiding the shell sections into their assembled position, FIG. 11 is a view corresponding to FIG. 10 showing, however, a second example of a guide means, FIG. 12 is a sectional view corresponding to FIG. 10 showing, however, a first example of connection means for mechanically connecting two shell sections manufactured by means of the method according to the invention, FIG. 13 is a sectional view corresponding to FIG. 12 showing, however, a second example of a mechanical connection means.

DETAILED DESCRIPTION OF THE INVENTION

Figure 1:
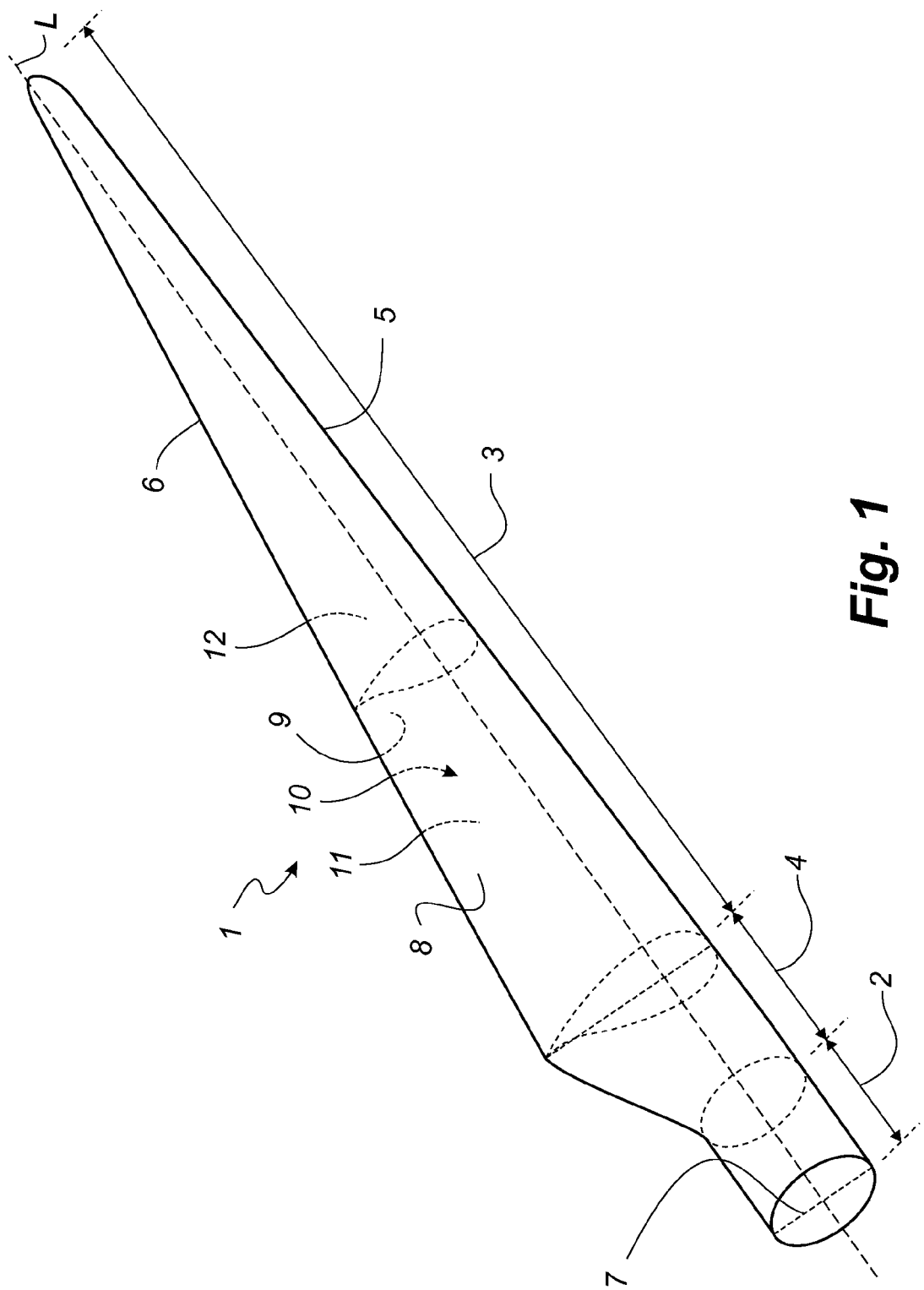

FIG. 1 is a schematic view of a wind turbine blade 1 having the shape of a conventional blade of an up-wind wind turbine according to the so-called "Danish concept". The blade 1 has a longitudinal axis L and comprises a root region 2, a profile or airfoil region 3, and a transition region 4 between the root region 2 and the airfoil region 3. The blade 1 comprises a leading edge 5 and a trailing edge 6. A chordal plane 7 extends between the leading edge 5 and the trailing 6 and defines the transition between a suction side 8 and a pressure side 9 of the blade 1. The chordal plane is illustrated by means of a dot-and-dash line. As previously mentioned, the blade 1 is manufactured by using two separately manufactured shell halves, i.e. a pressure side shell half and a suction side shell half of the blade, and subsequently gluing the two shell halves together. Alternatively, the blade may be manufactured by a hollow moulding method as explained later.

Figure 2:
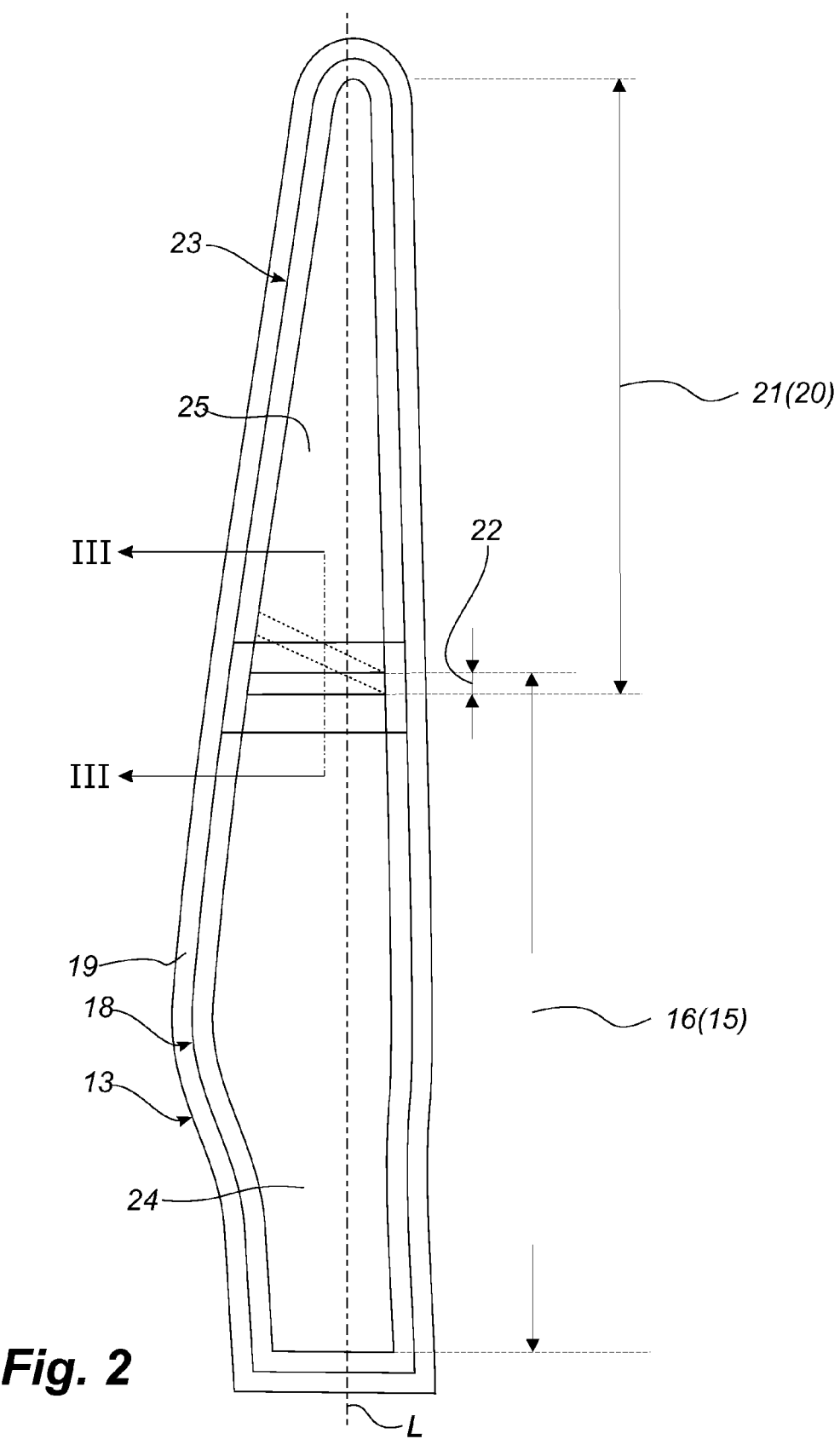
Figure 4:
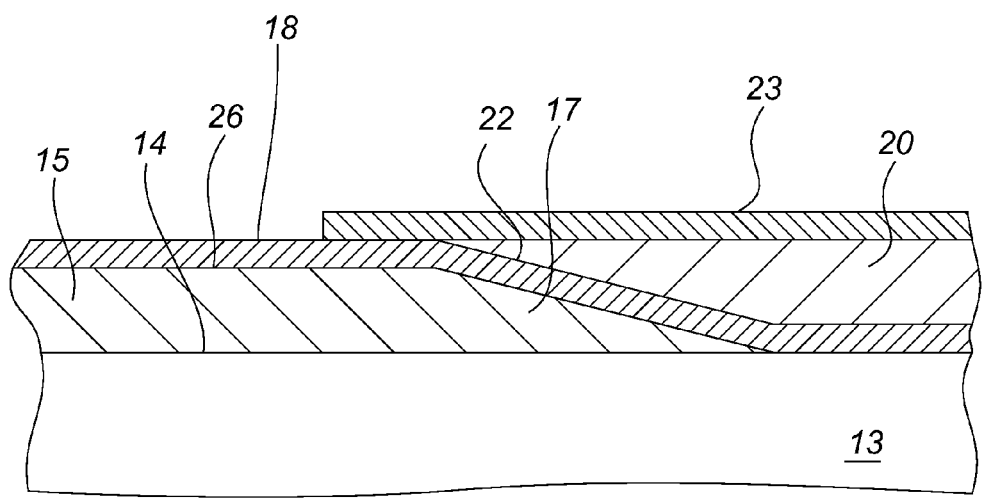

The method according to the invention is now explained by means of an embodiment for producing the pressure side shell half by reference to FIGS. 2 and 4.

Figure 12:
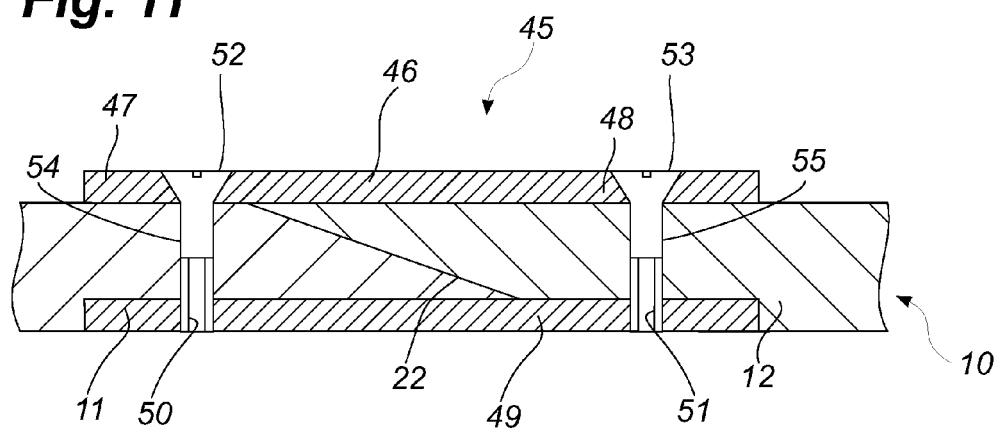
Figure 13:
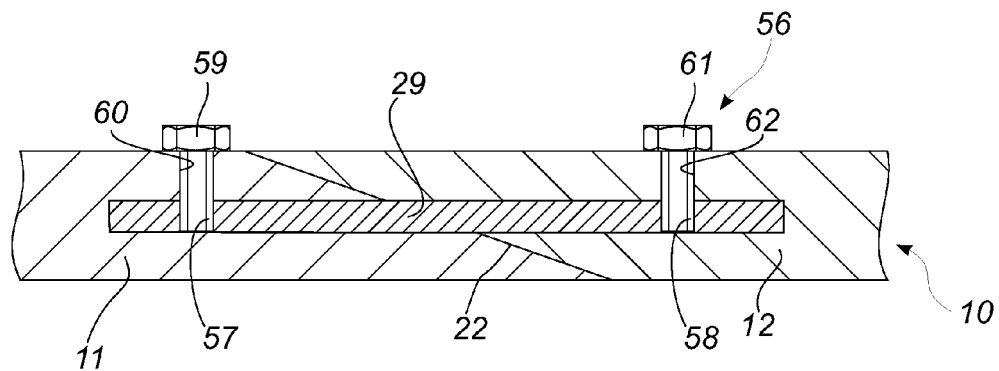

As indicated in FIG. 1, the shell half 10 comprises two separate shell half sections, i.e. a first and a second shell half section 11, 12, which are to be interconnected after the manufacturing thereof, the shell half sections being manufactured by VARTM. FIGS. 12 and 13 show a fraction of the manufactured shell halves 11, 12 assembled to form the shell half 10.

A first rigid mould part 13 is used for manufacturing the shell half 10. The first rigid mould part 13 has a first forming surface 14 with a contour defining the outer surface of the shell half 10, i.e. the pressure side 9.

A first fibre lay-up 15 is arranged in a first longitudinal section 16 of the first mould part 13. The first fibre lay-up 15 has a first crosswise edge area 17. Thereafter, a first flexible polymer foil 18 is arranged over the first fibre lay-up 15 so as to cover the lay-up completely and is sealed to the edge 19 of the first mould part 13 so as to form a first mould cavity 24.

Then, a second fibre lay-up 20 is arranged in a second longitudinal section 21 so that the second fibre lay-up 20 overlaps the first crosswise edge area 17 of the first fibre lay-up 15 and thereby the first flexible foil in an overlap area 22. The overlap area 22 forms an interface between the fibre lay-ups.

Subsequently, a second flexible polymer foil 23 is arranged over the second lay-up 20 so as to cover the second lay-up completely and is sealed to the edge 19 of the first mould part so as to form a second mould cavity 25.

The mould cavities 24, 25 are now evacuated by being connected to a non-shown vacuum source, whereupon liquid polymer, such as polyester or epoxy, is supplied to the mould cavities 24, 25 through non-shown polymer inlets connected to a polymer source. When the mould cavities have been filled with the liquid polymer, the supply thereof is stopped and the polymer is allowed to cure.

After curing, the formed first and second shell half sections 11,12 may be removed from the first rigid mould part 13 and connected, preferably by gluing, to corresponding shell half sections so as to form two blade sections, thus forming the suction side 8 of the wind turbine blade. Alternatively, when being connected to the corresponding shell half sections forming the suction side 8 of the blade, the formed shell half sections 11,12 may be retained in the first mould part 13. Thereafter, the formed blade sections are removed from the mould part and separated from each other. Subsequently, the formed wind turbine sections may be transported to the site of use, where a wind power plant is to be erected, and then assembled.

Above, the method according to the invention has been illustrated by using VARTM for manufacturing a composite structure in the form of a wind turbine blade shell half. However, any method for producing fibre-reinforced composite structures may be used. As an example, it should be mentioned that by using pre-pregs, the method is carried out as illustrated above except that polymer is not supplied to the mould cavities after the evacuation thereof as pre-impregnated fibre material is used in the lay-ups. Instead, the mould part is heated after evacuation of the mould cavities in order to liquefy the polymer, which is cured thereafter.

Figure 3:
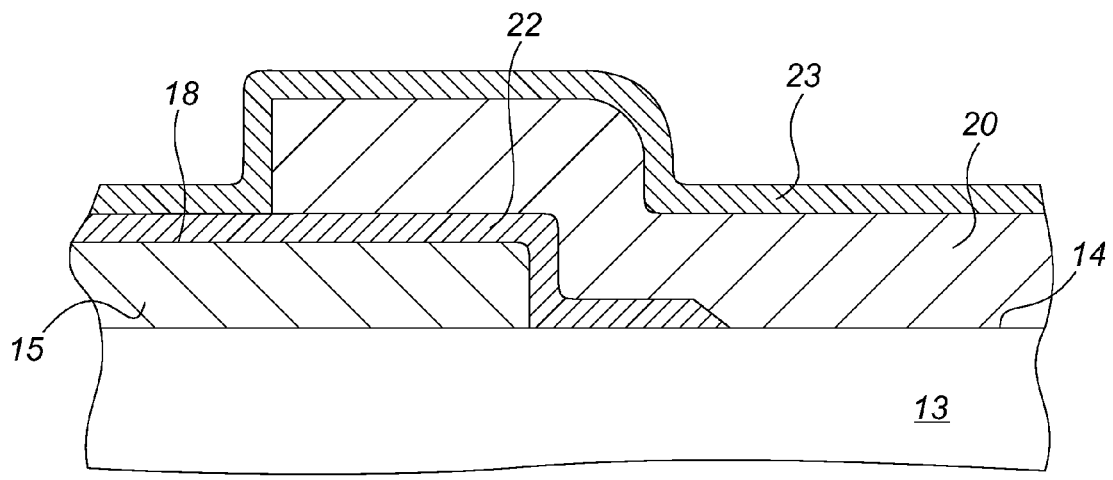
Figure 5:
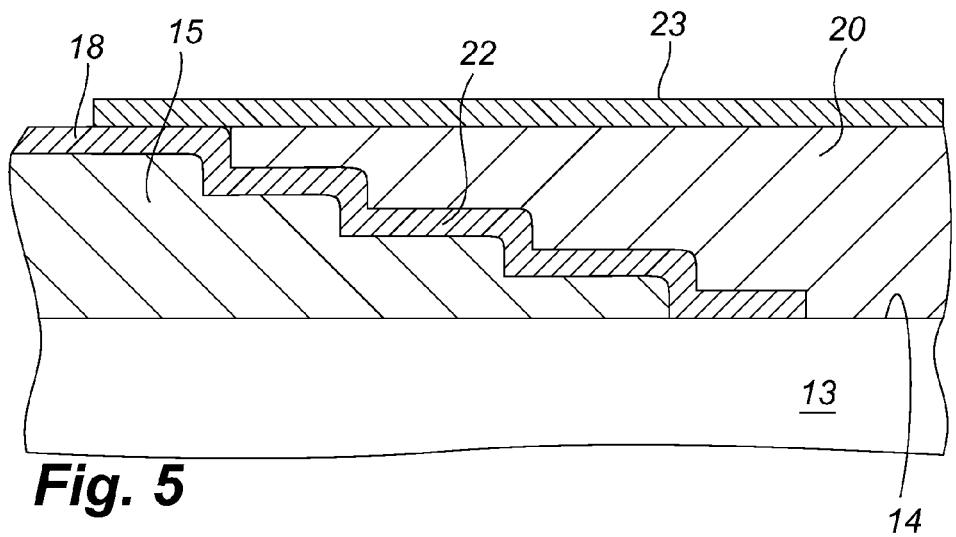
Figure 6:
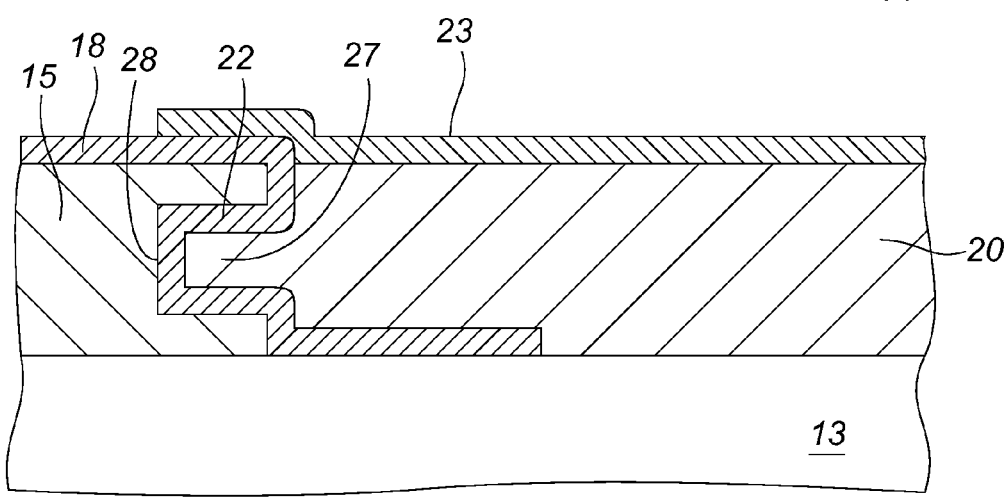

In the above embodiment, the overlap area, i.e. the interface 22, between the fibre lay-ups 15, 20 tapers gradually and continuously from the upper surface 26 of the first lay-up 15 towards the first forming surface 14 of the first mould part 13. As shown in FIG. 5, the interface 22 between the lay-ups 15,20 may, however, also taper stepwise, being formed with a tongue 27 and glue 28, as shown in FIG. 6, or in its entirety extend essentially parallel to the longitudinal axis of the shell half, i.e. the first mould part 13, as shown in FIG. 3. In fact, the interface 22 between the lay-ups 15,20 may have any desirable shape.

Further, in the above described embodiment, the overlap area, i.e. the interface 22, between the first and second fibre lay-ups 15,20 extends essentially perpendicular to the longitudinal axis of the shell half, i.e. the first mould part 13. However, as shown in FIG. 2 by means of dotted lines, the overlap area may also extend obliquely to the longitudinal axis L.

Figure 7:
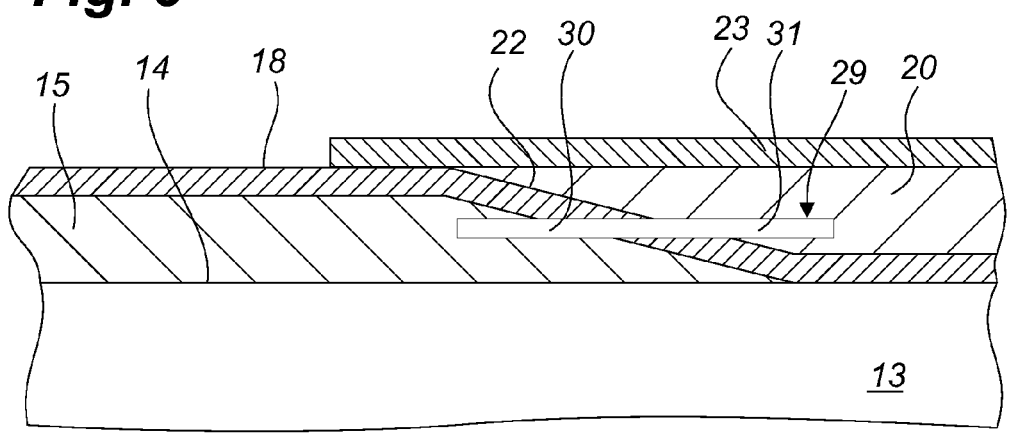

As shown in FIG. 7, longitudinally extending guide means may be arranged in the first and the second fibre lay-ups 15,20 to extend between the fibre lay-ups and crossing the overlap area 22 therebetween. The purpose of such guide means is to assist in fitting the formed shell half sections together, when they are to be assembled to form the shell half. In FIG. 7, the guide means is formed by a guide rod 29 arranged in the first and the second fibre lay-ups 15, 20 to longitudinally and sealingly extend through the first flexible foil 18 and so that a first portion 30 of the guide rod 29 extends into the first fibre lay-up 15, and a second portion 31 of the guide rod 29 extends into the second fibre lay-up 20. The first end 30 of the guide rod 29 is provided with a release agent allowing the guide rod to be removed from the first shell half section formed by the first fibre lay-up 15 after curing of the polymer supplied to the first fibre lay-up.

As an alternative to arranging the guide means in the fibre lay-ups, guide means may be arranged on upper surfaces 32,33 of the formed shell half sections 11,12. The guide means are arranged so as to cross the overlap area 22 therebetween and are preferably arranged while the shell half sections 11,12 are still in the first mould part 13. Examples of such guide means are shown in FIGS. 10 and 11.

Figure 10:
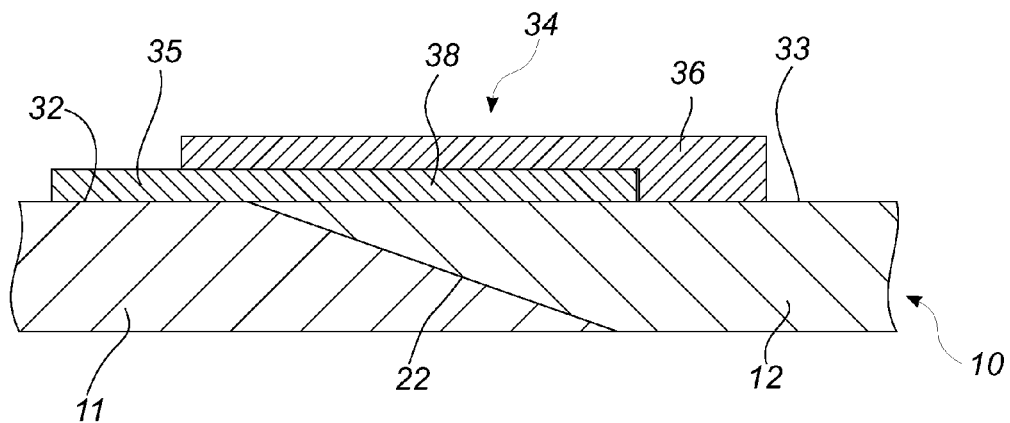

In FIG. 10, the guide means 34 comprises a plate member 35 attached to the upper surface 32 of the first shell half section 11 and extending past the overlap area 22. The guide means 34 further comprises a second member 36 attached to the upper surface 33 of the second shell half section 12. The second member 36 is shaped so as to form a receiving space 37 together with the upper surface 33 of the second shell section for fittingly receiving an end portion 38 of the plate member 35.

Figure 11:
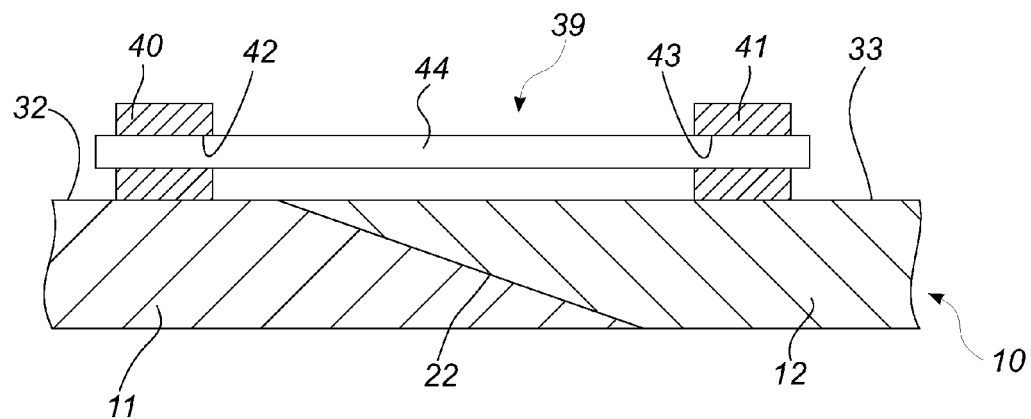

In FIG. 11, the guide means 39 comprises a first block 40 attached to the upper surface 32 of the first shell half section 11 and provided with a first through-going bore 42, a second block 41 attached to the upper surface 33 of the second shell half section 12 and provided with a second through-going bore 43, and a longitudinally extending guide pin 44 received in the first and the second through-going bores 42,43.

When assembling the formed first and second composite structure sections 11,12, such as shell half sections, a glue joint is normally used in the interface 22 between the sections. In addition to the glue joint, the composite structure sections 11,12 may also be interconnected by means of mechanical connecting means, such as illustrated in FIGS. 12 and 13.

In FIG. 12, the interconnecting means 45 comprises a first plate provided with an opening 47, 48 at each end and a second plate 49 provided with a hole with an inner thread 50,51 at each end thereof. The two plates 46,49 are connected by means of screws 52,53 extending through respective holes 54,55 in the first shell half section 11 and the second shell half section 12, respectively, and screwed into the threads 50,51, respectively.

The interconnecting means 56 shown in FIG. 13 is based on the guide means shown in FIG. 7, which has here been provided with an inner thread 57,58 at each end thereof. Through a hole 60 in the first shell half section 11, a first bolt 59 is screwed into the inner thread 57. A second bolt 61 is screwed through a hole 62 into an inner thread 58.

Although guide means and connection means have been described above by reference to shell half sections 11,12, they can be used for guiding any composite structure section into its assembled position and interconnecting any composite structure sections manufactured according to the present invention.

Figure 8:
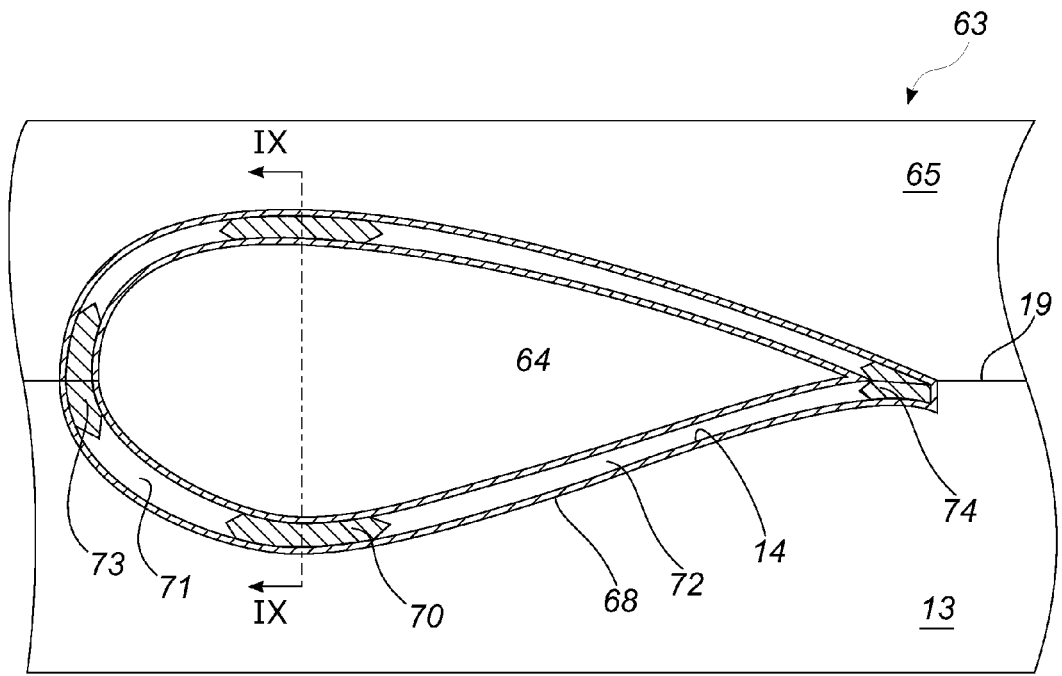
Figure 9:
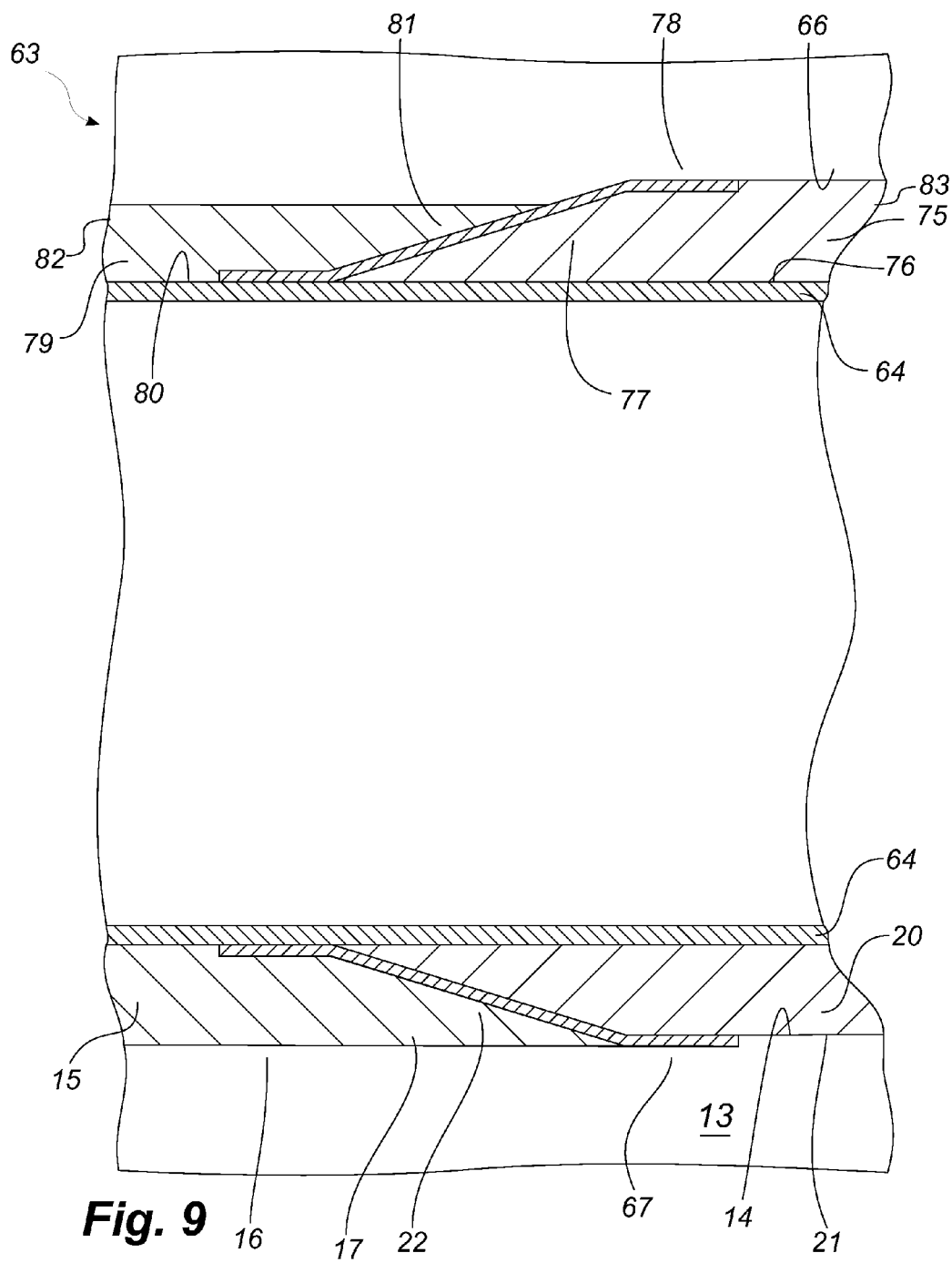

In order to illustrate how a hollow composite structure comprising two separate hollow composite structure sections can be manufactured in a closed mould by means of the invention, reference is made to FIGS. 8 and 9. The hollow composite structure is a wind turbine blade comprising two hollow blade sections.

The mould 63 to be used in a VARTM process comprises a flexible and collapsible mould core 64, the first rigid mould part 13 described by reference to FIGS. 2 and 4, and a second rigid mould part 65 having a second forming surface 66 with a contour defining an outer surface of the composite structure, in the present case an outer surface of the suction side of the blade. The first and second mould parts 13,65 are configured to close around the mould core 64 and to be sealed to each other along the edge thereof. The outer surface of the mould core may in itself be formed of a flexible and/or resilient polymer foil being able to function as a so-called vacuum foil or vacuum bag, or such a foil may be arranged over the entire outer surface of the mould core.

Initially, the first fibre lay-up 15 is arranged on the first longitudinal section 16 of the first mould part 13 so as to define the first crosswise edge area 17. Then, a first flexible polymer foil 67 is arranged over the first crosswise edge area as shown in FIG. 9.

Then, the second fibre lay-up 20 is arranged in the second longitudinal section 21 of the first mould part 13 so that it overlaps the first crosswise edge area of the first fibre lay-up and thereby the first flexible foil 67 in the overlap area forming the interface 22 between the fibre lay-ups 15,20.

As shown more clearly in FIG. 8, the fibre lay-ups 15, 20 comprise one or more lower fibre layers 68 arranged on the first forming surface 14, one or more upper fibre layers 69 being separated from the lower fibre layer 68. The layers 68, 69 are separated by means of a first fibre insertion 70 comprising a plurality of fibre layers, a first core part 71, and a second core part 72 as well as a first fibre-reinforcement 73 comprising a plurality of fibre layers and a second fibre-reinforcement 74 comprising a plurality of fibre layers.

Next, the mould core 64 is arranged on the first and second fibre lay-ups 15,20 and the first flexible foil 67. Thereafter, a third fibre lay-up 75 is arranged on a first longitudinal section 76 of the mould core 64. The third fibre lay-up 75 has a second crosswise edge area 77. Then, a third flexible foil 78 is arranged over the second crosswise edge area 77. Thereafter, a fourth fibre lay-up 79 is arranged on a second longitudinal section 80 of the mould core 64. The fourth fibre lay-up 79 is arranged so that it overlaps the second crosswise edge area 77 of the third fibre lay-up 75 and thereby the third flexible foil 78 in an overlap area 81 forming an interface between the third and the fourth fibre lay-ups. As is evident from FIG. 8, the fibre lay-ups 75, 79 correspond essentially to the fibre lay-ups 15,20, and a detailed description thereof is therefore omitted. Together the lay-ups 15,79 form a first hollow lay-up, which will be incorporated into a first hollow blade section, whereas the lay-ups 20,75 form a second hollow lay-up, which will be incorporated into a second hollow blade section. As can be seen from FIG. 8, the overlap areas, i.e. interfaces, 22,81 merge into each other as seen circumferentially so as to form a circumferentially continuous overlap area between the lay-ups, i.e. the first and second hollow lay-ups.

The mould is now closed by arranging the second mould part 65 over the first mould part 13 and the mould core 64. Thereby, a first circumferential mould cavity 82 and a second circumferential mould cavity 83 are formed, said cavities being separated by means of the first and third flexible foil 67,78.

Finally, the circumferential mould cavities 82, 83 are evacuated and liquid polymer supplied to the cavities, whereupon the polymer is allowed to cure.

When the polymer has cured, the formed hollow blade sections are removed from the mould and may be transported to the site of use, i.e. where a wind power plant is to be erected and assembled at that site.

Finally, it should be noted that instead of arranging the third and fourth fibre lay-ups 75, 79 and the third foil 78 on the mould core 64, they could be arranged on the second forming surface 66 of the second mould part 65 and retained in the second mould part 65, when it is arranged over the mould core and the first mould part in order to close the mould.

With reference to FIGS. 2-4, it has been described how the shell half sections 11, 12 shown assembled in FIGS. 12 and 13 are manufactured by VARTM using a first and a second flexible polymer foil.

Figure 14:
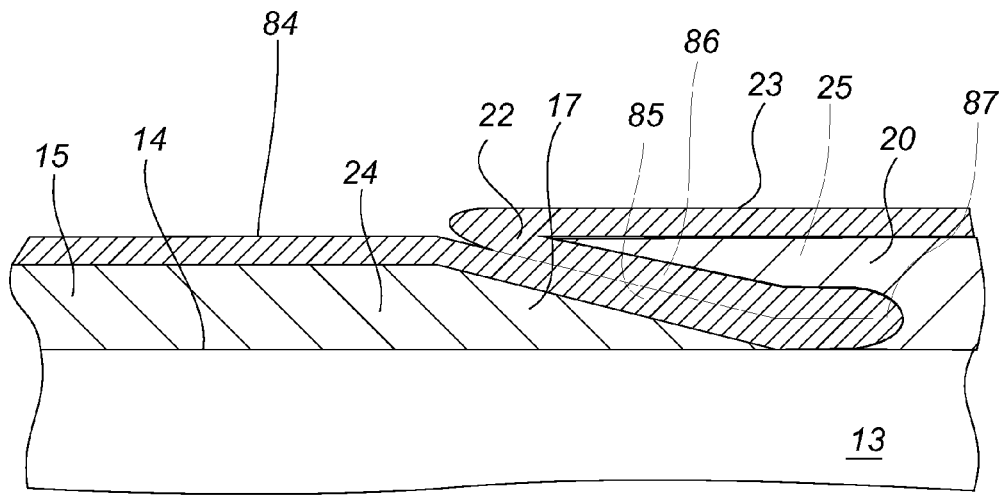
FIG. 14 shows how an embodiment of the method according to the invention may be carried out by using a single flexible polymer foil for providing two mould cavities.

Below and with reference to FIGS. 2 and 14 it is described how the shell half sections 11, 12 may be manufactured by VARTM using a single flexible polymer foil, i.e. only a first flexible polymer foil 18.

As described above, a first rigid mould part 13 is used for manufacturing the shell half 10. The first rigid mould part 13 has a first forming surface 14 with a contour defining the outer surface of the shell half 10, i.e. the pressure side 9.

A first fibre lay-up 15 is arranged in a first longitudinal section 16 of the first mould part 13. The first fibre lay-up 15 has a first crosswise edge area 17. Thereafter, a first flexible polymer foil 84 is folded onto itself along a fold 87 to provide a lower foil portion 85 and an upper foil portion 86. The polymer foil is now arranged over the first fibre lay-up 15 so as to cover the lay-up completely, the lower foil portion facing the first fibre lay-up 15 and the fold abutting to the forming surface 14. Thereafter the lower foil portion is sealed to the edge 19 of the first mould part 13 so as to form a first mould cavity 24.

Then, a second fibre lay-up 20 is arranged in a second longitudinal section 21 so that the second fibre lay-up 20 overlaps the first crosswise edge area 17 of the first fibre lay-up 15 and thereby the first flexible foil in an overlap area 22, where the foil is folded onto itself. The folded overlap area 22 forms an interface between the fibre lay-ups.

Subsequently, the upper foil portion 86 of the polymer foil 84 is folded onto the second lay-up 20 so as to cover the second lay-up completely and is sealed to the edge 19 of the first mould part so as to form a second mould cavity.

The mould cavities 24, 25 are now evacuated by being connected to a non-shown vacuum source, whereupon liquid polymer, such as polyester or epoxy, is supplied to the mould cavities 24, 25 through non-shown polymer inlets connected to a polymer source. When the mould cavities have been filled with the liquid polymer, the supply thereof is stopped and the polymer is allowed to cure.

After curing, the formed first and second shell half sections 11,12 may be removed from the first rigid mould part 13 and connected, preferably by gluing, to corresponding shell half sections so as to form two blade sections as described above.

Figure 15:
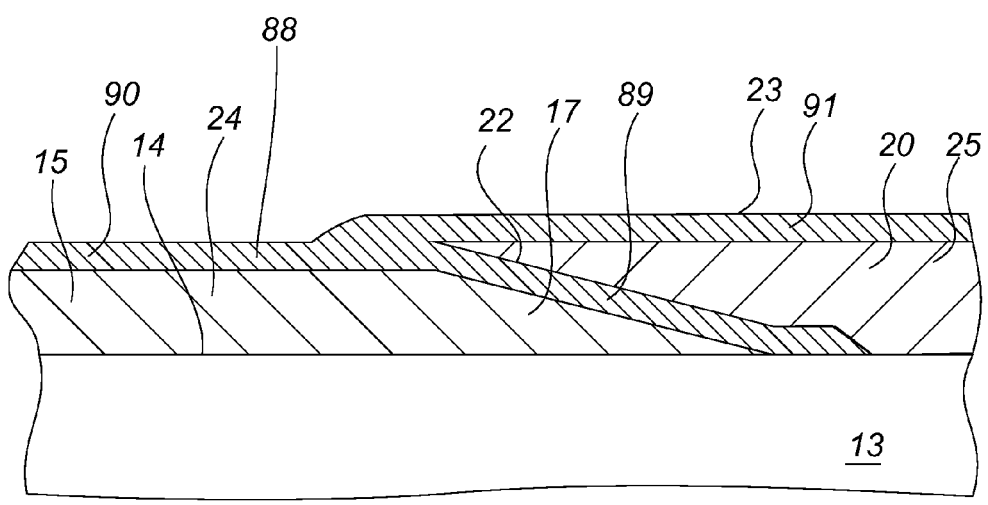
FIG. 15 shows an alternative flexible polymer foil for providing two mould cavities.

Below and with reference to FIGS. 15 and 2 it is described how the shell half sections 11, 12 shown assembled in FIGS. 12 and 13 may be produced by VARTM, using a single flexible polymer foil 88 having a flap 89.

A first fibre lay-up 15 is arranged in a first longitudinal section 16 of the first mould part 13. The first fibre lay-up 15 has a first crosswise edge area 17. Thereafter, a first flexible polymer foil 88 with a flap 89 is arranged over the first fibre lay-up 15 so as to cover the lay-up completely. The flap 89 divides the foil 88 into a first and a second portion 90, 91. The foil 88 is arranged such that the first portion covers the first fibre lay-up and the flap extends beyond the first crosswise edge area 17 and onto the first forming surface 14. Thereafter the flap 89 and the first portion of the polymer foil 88 covering the first fibre lay-up 15 is sealed to the edge 19 of the first mould part 13 so as to form a first mould cavity 24.

Then, a second fibre lay-up 20 is arranged in a second longitudinal section 21 so that the second fibre lay-up 20 overlaps the first crosswise edge area 17 of the first fibre lay-up 15 and thereby the flap 89 in an overlap area 22. The overlap area 22 forms an interface between the fibre lay-ups.

Subsequently, the second portion 91 of the foil 88 is arranged over the second lay-up 20 so as to cover the second lay-up completely and is sealed to the edge 19 of the first mould part so as to form a second mould cavity 25.

The mould cavities 24, 25 are now evacuated by being connected to a non-shown vacuum source, whereupon liquid polymer, such as polyester or epoxy, is supplied to the mould cavities 24, 25 through non-shown polymer inlets connected to a polymer source. When the mould cavities have been filled with the liquid polymer, the supply thereof is stopped and the polymer is allowed to cure.

After curing, the formed first and second shell half sections 11, 12 may be removed from the first rigid mould part 13 and connected, preferably by gluing, to corresponding shell half sections so as to form two blade sections, as described above.

Figure 16:
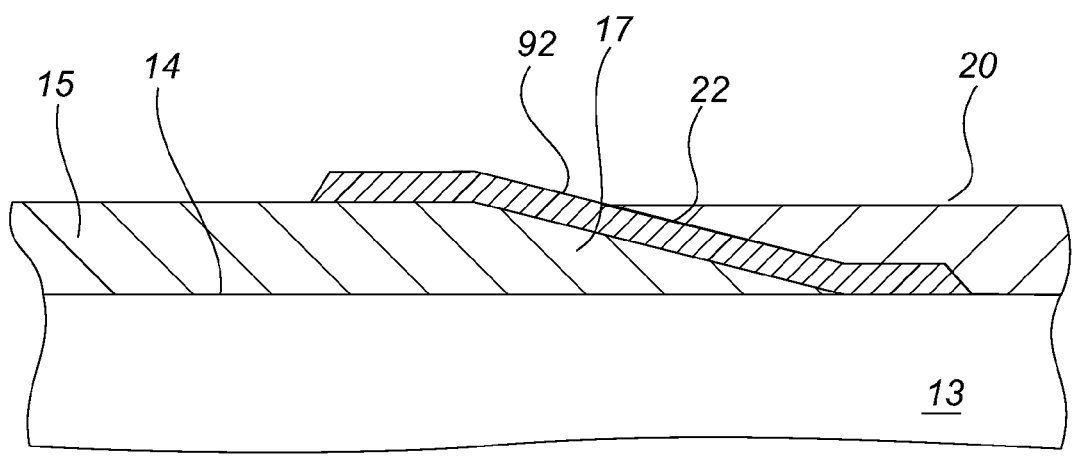
FIG. 16 shows an embodiment of the method according to the invention, where essentially only the overlapping area between two fibre lay-ups is formed of a flexible polymer foil being a narrow foil strip.

Below and with reference to FIGS. 16 and 2 it is described how the shell half sections 11, 12 shown assembled in FIGS. 12 and 13 may be produced by hand lay-up using a single flexible polymer foil in the form of a foil strip.

A first fibre lay-up 15 is arranged in a first longitudinal section 16 of the first mould part 13. The first fibre lay-up 15 has a first crosswise edge area 17. During the lay-up of the fibre material, resin is supplied thereto to wet or impregnate all of the fibres. Thereafter, a flexible polymer foil formed as a foil strip 92 is arranged over the first fibre lay-up 15 to cover the first crosswise edge area 17, an adjacent portion of the first fibre lay-up and extend onto the first forming surface 14. The foil strip 92 extends onto the edge 19 of the first mould part 13. It should be noted that the foil strips 92 only covers a portion of the first fibre lay-up 15.

Then, a second fibre lay-up 20 is arranged in a second longitudinal section 21 so that the second fibre lay-up 20 overlaps the first crosswise edge area 17 of the first fibre lay-up 15 and thereby the flexible foil in an overlap area 22. The overlap area 22 forms an interface between the fibre lay-ups. During the lay-up of the second fibre lay-up 15, the fibre material thereof is wetted and impregnated with resin. It should be noted that no portion of the second fibre lay-up is covered by a foil.

The resin or liquid polymer may be polyester, epoxy, vinylester or another suitable polymer.

Thereafter, the resin or polymer is allowed to cure. After curing, the formed first and second shell half sections 11, 12 may be removed from the first rigid mould part 13 and connected, preferably by gluing, to corresponding shell half sections so as to form two blade sections, as described above.

The invention has been described with reference to advantageous embodiments. However, the scope of the invention is not limited to the illustrated and described embodiments, and alterations and modifications can be carried out without deviating from the scope of the invention.

LIST OF REFERENCE NUMERALS

1 Wind turbine blade
2 Root region
3 Airfoil region
4 Transition region
5 Leading edge
6 Trailing edge
7 Chordal plane
8 Suction side
9 Pressure side
L Longitudinal axis
10 Composite structure; shell half
11 First composite structure section, first shell half section
12 Second composite structure section; second shell half section
13 First rigid mould part
14 First forming surface
15 First fibre lay-up
16 First longitudinal section
17 First crosswise edge area
18 First flexible polymer foil
19 Edge
20 Second fibre lay-up
21 Second longitudinal section
22 Overlap area; interface
23 Second flexible polymer foil
24 First mould cavity
25 Second mould cavity
26 Upper surface
27 Tongue
28 Groove
29 Guide rod
30 First portion
31 Second portion
32 First upper surface
33 Second upper surface
34 Guide means
35 Blade member
36 Second member
37 Receiving space
38 End portion
39 Guide means
40 First block
41 Second block
42 First through bore
43 Second through bore
44 Guide pin
45 Interconnecting means
46 First plate
47 Opening
48 Opening
49 Second plate
50 Hole with inner thread
51 Hole with inner thread
52 Screw
53 Screw
54 Hole
55 Hole
56 Interconnecting means
57 Inner thread
58 Inner thread
59 First bolt
60 Hole
61 Second bolt
62 Hole
63 Mould
64 Mould core
65 Second rigid mould part
66 Second forming surface
67 First polymer foil
68 Lower fibre layer
69 Upper fibre layer
70 First fibre insertion
71 First core part
72 Second core part
73 First fibre-reinforcement
74 Second fibre-reinforcement
75 Third fibre lay-up
76 First longitudinal section of mould core 77 Second crosswise edge area
78 Third flexible polymer foil
79 Fourth fibre lay-up
80 Second longitudinal section of mould core
81 Overlap area; interface
82 First circumferential mould cavity
83 Second circumferential mould cavity
84 Flexible polymer foil
85 Lower foil portion
86 Upper foil portion
87 Fold
88 Flexible polymer foil
89 Flap
90 First portion
91 Second portion
92 Foil Strip

The invention claimed is:

1. A method of manufacturing an elongated composite structure having a longitudinal axis and comprising at least a first and a second, separate longitudinal composite structure section, the first and the second separate longitudinal composite structure sections being different from each other, the first and second longitudinal composite structure sections arranged in longitudinal extension of each other, and being formed of reinforced polymer material including a polymer matrix and fibre material embedded in the polymer matrix, wherein the method comprises the followings steps:
   a) providing a first rigid mould part having a first forming surface with a contour defining an outer surface of the elongated composite structure,
   b) arranging a first fibre lay-up in a first longitudinal section of the first mould part, the first fibre lay-up defining a first crosswise edge area,
   c) arranging at least one first flexible and resilient foil, over at least the first crosswise edge area of the first fibre lay-up,
   d) arranging a second fibre lay-up in a second longitudinal section of first rigid mould part so that the second fibre lay-up overlaps the first crosswise edge area of the first fiber lay-up and thereby the first flexible foil in an overlap area forming an interface between the first fibre lay-up and second fibre lay-up,
   e) providing polymer to the first and second longitudinal sections simultaneously with steps b) and d), respectively, and/or after step d),
   f) curing or allowing the polymer to cure so as to form the first longitudinal composite structure section and the second longitudinal composite structure section, and
   g) separating the first longitudinal composite structure section and the second longitudinal composite structure section from each other at the overlap area forming an interface, and
      wherein the first and second longitudinal composite structure sections are later assembled at the interface so as to form the elongated composite structure.

2. Method according to claim 1, wherein in step c) the at least one first flexible foil is arranged so as to cover the entire first fibre lay-up and is sealed to the first rigid mould part to form a first mould cavity and wherein subsequent to step d) and prior to step f) a second flexible and resilient foil, is arranged over the second fibre lay-up and sealed to the first rigid mould part so as to form a second mould cavity.

3. Method according to claim 1, further comprising the step of arranging at least one second flexible foil, over the first and the second fibre lay-up and sealing the at least one second flexible foil to the first rigid mould part to form a first mould cavity and a second mould cavity, the first and the second mould cavity being separated by the first flexible foil.

4. Method according to claim 1, wherein the elongated composite structure is a hollow structure comprised of a first hollow composite structure section and a second hollow composite structure section formed in a closed mould, the closed mould comprising a flexible and collapsible mould core, the first rigid mould part and a second rigid mould part having a second forming surface with a contour defining an outer surface of the composite structure, the first and second rigid mould parts being arranged to close around the mould core, and wherein subsequent to step d):
   the mould core is arranged on the first and second fibre lay-up and the first flexible foil, the first and second fibre lay-up to be formed into the first hollow composite structure section,
   a third fibre lay-up is arranged on a first longitudinal section of the mould core and/or the second rigid mould part, the third fibre lay-up defining a second crosswise edge area,
   a third flexible foil, is arranged over at least the second crosswise edge area,
   a fourth fibre lay-up is arranged on a second longitudinal section of the mould core and/or the second rigid mould part so that the fourth fibre lay-up overlaps the second crosswise edge area of the third fibre lay-up and thereby the third flexible foil in a second overlap area forming a second interface between the third and the fourth lay-up, the third and fourth fibre lay-up to be formed into the second hollow composite structure section, and
   the mould is closed by arranging the second rigid mould part over the first rigid mould part and the mould core to form a first circumferential mould cavity and a second circumferential mould cavity, the first and the second circumferential mould cavities being separated by means of the first and third flexible foil.

5. Method according to claim 2, wherein the first and the second mould cavities are evacuated prior to step e).

6. Method according to claim 2, wherein fluid polymer is supplied to the first and the second mould cavity during step e) to fill the mould cavities with polymer.

7. Method according to any of the preceding claim 1, wherein pre-impregnated fibre material is arranged in the first and/or the second longitudinal section of the first rigid mould part during step b) and/or step d).

8. Method according to claim 1, wherein the interface between the first and the second fibre lay-up is substantially parallel to the longitudinal axis of the composite structure to be manufactured.

9. Method according to claim 1, wherein the interface between the first and the second fibre lay-ups is tapering from an upper surface of the first fibre lay-up towards the first forming surface of the first rigid mould part.

10. Method according to claim 9, wherein the interface tapers gradually.

11. Method according to claim 1, wherein the interface between the first and the second fibre lay-up is formed as a tongue and a groove in the respective lay-ups.

12. Method according to claim 1, wherein the elongated composite structure is at least a part of a shell half of a wind turbine blade, the first and the second longitudinal composite structure sections forming respective longitudinal sections of the shell half of the wind turbine blade.

13. Method according to claim 4, wherein the hollow structure is at least a part of a wind turbine blade, wherein the first and second hollow composite structure sections form respective longitudinal sections of the wind turbine blade.

14. Method according to claim 1, wherein the first composite structure section is separated from the second composite structure section after being removed from the first rigid mould part.

15. Method according to claim 14 further comprising transportation of the separated first and second longitudinal composite structure sections to the site of use and wherein the assembly of the first and second longitudinal composite structure sections occurs at the site.

* * * * *